US011287075B2

(12) United States Patent
Noll

(10) Patent No.: US 11,287,075 B2
(45) Date of Patent: Mar. 29, 2022

(54) DEVICE FOR RENOVATING DAMAGED LINE WALLS, COMPRISING A HEATING DEVICE FOR QUICKLY CURING THE RENOVATION COMPOUND

(71) Applicant: PIPETRONICS GMBH & CO. KG, Rohrbach (DE)

(72) Inventor: Christian Noll, Limburgerhof (DE)

(*) Notice: Subject to any disclaimer, the term of this patent is extended or adjusted under 35 U.S.C. 154(b) by 66 days.

(21) Appl. No.: 16/611,931

(22) PCT Filed: May 9, 2018

(86) PCT No.: PCT/DE2018/100448
§ 371 (c)(1),
(2) Date: Nov. 8, 2019

(87) PCT Pub. No.: WO2018/206055
PCT Pub. Date: Nov. 15, 2018

(65) Prior Publication Data
US 2021/0148501 A1    May 20, 2021

(30) Foreign Application Priority Data
May 9, 2017 (DE) .................. 10 2017 109 980.8

(51) Int. Cl.
*F16L 55/18* (2006.01)
*F16L 55/1645* (2006.01)
(Continued)

(52) U.S. Cl.
CPC ....... *F16L 55/1645* (2013.01); *F16L 55/1003* (2013.01); *F16L 55/134* (2013.01)

(58) Field of Classification Search
CPC .. F16L 55/1645; F16L 55/1003; F16L 55/134
(Continued)

(56) References Cited

U.S. PATENT DOCUMENTS 3,103,235 A * 9/1963 Stringham, III .. F16L 55/16455
138/97
3,834,422 A * 9/1974 Larson .............. F16L 55/16455
138/97
(Continued)

FOREIGN PATENT DOCUMENTS

DE  19641365 A1    4/1998
DE  19644466    *  4/1998  ................ E03F 3/06
(Continued)

OTHER PUBLICATIONS

International Search Report with Written Opinion, dated Jul. 18, 2018, received in international patent application No. PCT/DE2018/100448, 12 pages.

*Primary Examiner* — James F Hook
(74) *Attorney, Agent, or Firm* — Verrill Dana, LLP; Robert L. Hover

(57) ABSTRACT

A device for renovating damaged line walls proximate the connection of an auxiliary line to a main line, includes a movable support element, wherein a cover element and an expandable element are arranged on the support element. The expandable element can be positioned in the auxiliary line in or through a first recess in the cover element, and can lie against the wall of the auxiliary line to form a shell. The cover element has a second recess for introducing a curable viscous renovation compound from a storage device into space between the shell and the main and auxiliary line walls by a transport element. A heating device can be integrated into the cover element, the storage device, and/or the transport element proximate the second recess and/or operatively connected to the cover element, the storage device, and/or the transport element in the region of the second recess.

17 Claims, 2 Drawing Sheets

(51) Int. Cl.
*F16L 55/10* (2006.01)
*F16L 55/134* (2006.01)

(58) Field of Classification Search
USPC .............................. 138/97; 405/150.2, 184.1
See application file for complete search history.

(56) References Cited

U.S. PATENT DOCUMENTS

| | | | | | |
|---|---|---|---|---|---|
| 4,245,970 | A | * | 1/1981 | St. Onge | B29C 44/386 |
| | | | | | 138/93 |
| 4,728,223 | A | * | 3/1988 | Rice | E03F 3/06 |
| | | | | | 138/97 |
| 5,040,922 | A | * | 8/1991 | Himmler | F16L 55/179 |
| | | | | | 405/155 |
| 5,285,817 | A | * | 2/1994 | Sigel | F16L 55/18 |
| | | | | | 138/93 |
| 5,309,947 | A | * | 5/1994 | Hinger | E03F 3/06 |
| | | | | | 118/306 |
| 5,527,133 | A | * | 6/1996 | Csillag | F16L 55/179 |
| | | | | | 138/97 |
| 6,068,725 | A | * | 5/2000 | Tweedie | F16L 55/179 |
| | | | | | 138/97 |

FOREIGN PATENT DOCUMENTS

| | | | | |
|---|---|---|---|---|
| DE | 19960831 | * | 6/2001 | ............ F16L 55/162 |
| DE | 10049101 C1 | | 4/2002 | |
| WO | WO 95/27167 | * | 10/1995 | .............. F16L 55/16 |

* cited by examiner

DEVICE FOR RENOVATING DAMAGED LINE WALLS, COMPRISING A HEATING DEVICE FOR QUICKLY CURING THE RENOVATION COMPOUND

The present invention relates to an apparatus for rehabilitating damaged pipe walls in the region of the connection of a secondary pipe to a main pipe.

The prior art has disclosed apparatuses for such a rehabilitation, in which apparatuses a sewer rehabilitation robot which is self-propelling or is movable by means of ropes in the sewer comprises a carrying apparatus for various rehabilitation tools. Said tools, in particular a spatula device, can be controlled from outside the sewer after the robot is positioned in the region of the damaged area.

Moreover, for the repair of damaged areas in the region of the connection of a secondary pipe to a main pipe, apparatuses are described in the prior art, in which the sewer rehabilitation robot which can be arranged in the main sewer forms a carrying apparatus for a covering which can be placed onto the wall of the main pipe in the region of the secondary sewer connection.

The covering, for its part, carries an expandable expansion body, also called balloon, which can be introduced into the secondary pipe. When expanded, said expansion body lies against the wall of the secondary pipe and then, together with the covering, forms a shuttering which supports a viscous sealing compound, introduced into said shuttering, before said sealing compound is cured. After the curing, the expansion body contracts and the covering is removed and the sealing compound forms the restored, previously damaged sewer wall regions. Such a covering according to the prior art, also referred to as shuttering sleeve, has basically already been disclosed in an embodiment from WO 1995027167 A1.

There is the possibility in principle of supplying the viscous, curable sealing compound, which is used by the apparatuses of the type described, from the exterior of the sewer to the sewer rehabilitation unit via tubes or other movable pipes.

However, this solution is not only complicated but also disadvantageous in a variety of respects. The retracing of pipes restricts the manoeuvrability of the apparatus in the sewer considerably, in particular since often a plurality of damaged areas to be rehabilitated occur in a sewer and the damaged areas may also be located more than 100 metres away from the site at which the sewer rehabilitation robot is introduced. The supply pipes for the spatula compound or sealing compound therefore have to be very long.

Pressing the viscous rehabilitation compound through such long pipes causes considerable problems. Viscous, in particular thixotropic media cause a speed-dependent loss of pressure during each movement in the pipe. The numerical values for viscosity and shearing stress in the rehabilitation compound vary greatly with the pipe geometry, the temperature and the precise state of the rehabilitation compound which frequently contains granular components.

Particularly when the apparatuses operate with shutterings, it is particularly important to maintain certain pressure ranges during the pressing of the rehabilitation compound. The pressure basically has to be at least high enough to ensure that the rehabilitation compound completely fills all of the defective sewer wall regions. However, the pressure must not be so high that it subjects the damaged and fragile sewer wall regions to an excessive load.

Since the operator generally sits dozens of metres away, it is generally too much to expect the operator to set the conveying pressure for the rehabilitation compound in such a manner that said compound arrives at the required pressure in the region of the spatula device or the shuttering formed by a covering and an expansion body.

Solutions are therefore known from the prior art in order to dispense with use of pipes for supplying the rehabilitation compounds.

DE 36 18 963 discloses a sewer rehabilitation apparatus which is equipped with a covering and expansion body and in which the rehabilitation compound is arranged around the initially slack expansion body and is then driven together therewith into the secondary sewer. When the expansion body expands, it presses the rehabilitation compound radially against the damaged sewer wall.

The drawback of this is that only rehabilitation compounds with a long pot life can be used. Pot life is understood as meaning the processability duration of reactive materials. It is therefore the time between starting to mix a multi-component substance and the end of the processability thereof, i.e. the period of time in which the substance can still be taken out of the pot and processed.

Since two-component adhesives are customarily used as the rehabilitation compound, in the case of a solution according to DE 36 18 963 the time until curing therefore has to be defined with a good deal of certainty so that it is ensured that the shuttering has set prior to the end of the pot life.

It has therefore alternatively been disclosed in the prior art to arrange the rehabilitation compound directly on the rehabilitation robot in cartridges, cylinders and storage containers, which can be emptied by means of pumps.

However, a problem with this is that it extends the necessary pot life. When storage containers are used, the rehabilitation compound begins to cure at the latest when the storage containers are filled therewith and therefore already before the rehabilitation robot is introduced into the pipe to be rehabilitated.

It should be noted here that the fitting of the shuttering comprises a plurality of working steps. First of all, the covering element is expanded in the main pipe, then the expansion body is introduced through a recess into the secondary pipe and likewise expanded by a small needle-shaped connecting element having to be introduced into the valve of the expansion body. Subsequently, a closure in the covering has to be opened, and the outlet of a pipe for transporting the rehabilitation compound has to be pressed there into the intermediate space between the shuttering, formed by the covering and the expansion body, and the existing walls.

Each of said working steps is potentially error-prone and possibly has to be repeated several times, and therefore the pot life has to be configured with a high degree of certainty for such operating errors. The curing time of the rehabilitation compound until the shuttering can be removed again is correspondingly long.

However, it is desirable to minimize the period of time in which the shuttering has to remain in the pipe. This reduces working costs and also the costs for keeping the sewer rehabilitation robot ready.

The known apparatuses therefore have the disadvantage that, although the omission of external supply pipes for the rehabilitation compound make it possible to minimize the correct pressurization problems, a long curing time is necessary since the rehabilitation compound carried along has to have a pot life of a sufficient size.

It was therefore the object of the present invention to overcome the disadvantages of the prior art and in particular to supply an apparatus permitting more rapid and more reliable rehabilitation of pipes, wherein as rapid a curing as possible of the rehabilitation compound is made possible.

This object is achieved by an apparatus for rehabilitating damaged pipe walls in the region of the connection of a secondary pipe to a main pipe, comprising a mobile carrier element, wherein a covering element and an expandable expansion body are arranged on the carrier element, and wherein the expandable expansion body when not expanded is positioned or is positionable at least in sections in a or by means of a first recess in the covering element in the secondary pipe and, when expanded, lies against the wall of the secondary pipe such that the covering element and the expansion body together form a shuttering, and wherein the covering element has a second recess through which a viscous, curable rehabilitation compound can be introduced by means of a transport means from a storage device into the space between the shuttering and the walls of the main and secondary pipes adjacent to the shuttering, wherein the apparatus comprises a heating device which is integrated in the covering element and/or in the storage device and/or is operatively connected to the covering element and/or to storage device.

A carrier element is intended to be understood as meaning in particular an element which is movable on wheels or chains and has an integrated drive. Alternatively to an integrated drive, the carrier element can also be moved in the pipe by means of ropes, cables and the like.

A covering element is intended to be understood as meaning an element which can cover the inner wall of the main pipe in such a manner that a defined cavity is formed between the covering element and the space located there behind, the cavity being sealed in relation to the rehabilitation compound and preventing penetration of the latter into the main pipe.

It has frequently proven advantageous to provide the covering element in the form of a hollow cylinder, the inside diameter of which can be changed. The hollow cylinder is thus moved in a transport state with a reduced inside diameter by means of the carrier element to the damaged area and then expands there such that it lies fixedly against the inner walls of the main pipe.

An expansion body is intended to be understood as meaning a size-variable element which is generally based on plastic or rubber and basically resembles a balloon. Furthermore, the expansion body comprises in particular a valve in order to permit expansion with compressed air and, when the valve is opened, to permit subsequent contraction.

The expansion body is arranged here in a first recess in the covering element and expands into the secondary pipe. The covering element and the expansion body together form a shuttering which corresponds, at least approximately, to the inside diameter of the pipes.

The rehabilitation compound can subsequently be pressed via a second recess in the covering element into the cavity closed by the shuttering. After the rehabilitation compound has cured, the shuttering is removed by the expansion body contracting and being removed from the first recess of the covering element. The covering element itself is subsequently contracted in order to be able to be removed from the main pipe.

A heating device according to the invention makes it possible to significantly reduce the curing duration of the rehabilitation compound here. According to the invention, the heating device can be integrated here in the covering element and/or in the transport means at least in the region of the second recess or can be operatively connected to said region.

The rehabilitation compound can therefore preferably already be preheated in the transport means, generally a tube. Alternatively or additionally, a heating device can also be integrated in the shuttering and can provide heating power during the entire curing process in order to accelerate same.

The invention is based here on the surprising finding that the disadvantages of the prior art can be overcome by use being able to be made of a rehabilitation compound with a sufficiently long pot life and therefore longer curing duration, and at the same time rapid curing is ensured by means of the heating power which is provided.

According to one embodiment, it can be provided that the microwave-generating device comprises a magnetron, which generates microwaves, and a radiation antenna, for radiating the microwaves generated by the magnetron into the space between the shuttering and the walls of the main and secondary pipe adjacent to the shuttering and/or into the storage device, wherein the radiation antenna preferably is formed by the covering element, surrounded by the latter or is operatively connected to the latter.

It has proven particularly advantageous for the rehabilitation compound to be heated by means of microwave radiation. It can be particularly advantageous here if the rehabilitation compound after being introduced into the space between the shuttering and the walls of the main and secondary pipe adjacent to the shuttering is heated, wherein the covering element is used as the radiation antenna. It can be advantageous here for the covering element itself to form the radiation antenna, or for the radiation antenna to be at least partially integrated in the covering element. As a likewise alternative preference, the radiation antenna can be operatively connected to the covering element.

It can be provided here in particular that the heating device is in the form of a heating tube, a radiation source, in particular an infrared heating apparatus and/or a microwave-generating device, and/or an electric heater.

A heating device is intended to be understood basically as meaning any heat-generating apparatus, the function of which consists primarily in generating the provision of thermal energy. Apparatuses which produce what is referred to as waste heat, for example lamps, electric motors and the like, are not understood as a heating device within the context of the invention.

The preferred heating devices have proven particularly advantageous here for heating up the rehabilitation compound.

It can also be preferred according to the invention for the storage device to be arranged on the carrier element.

As already explained, it is known in the prior art that the storage device for the rehabilitation compound is arranged outside the pipe system. The disadvantages in this regard have been described. However, it has been shown that directly integrating the storage apparatus on the carrier element permits a particularly compact constructional form and in particular permits the omission of a second carriage or robot.

It can be provided here that the rehabilitation compound can be introduced from the storage device by pressurization into the interior of the storage device and/or by a pumping device via the transport means into the space behind the shuttering.

The rehabilitation compound has to be pressed under a respectively individual minimum pressure into the cavity defined by the shuttering. Furthermore, the pressure, however, must not be so high that the shuttering can no longer fulfil its sealing function. In order to be able to set a such defined pressure, pumping devices, for example peristaltic pumps or piston pumps, have proven particularly suitable. Alternatively, however, it can also be possible to permit a flow of the rehabilitation compound into said cavity by means of pressurization within the storage device.

According to an embodiment of the present invention, it can be advantageous that the covering element has a smaller inside diameter in a transport state than in an operating state, and in particular is in the form of a shuttering sleeve.

The formation of the covering element with different inside diameters is advantageous and is known from the prior art. In particular, formation of the covering element in the form of a shuttering sleeve has the advantage that the cylindrical covering element can be very readily transported in the pipe and is fixed very securely in the operating state since it can be automatically aligned within the main pipe and arrested in the desired position by means of the contact pressure without further aids having to be used.

Furthermore, it has proven advantageous according to one embodiment that a compressed-air-generating element, in particular in the form of a compressor and/or a compressed-air container, is included in order to expand the expansion body by means of compressed air.

It can be provided in particular that the expansion body comprises a valve which is arranged in the region of the first recess and/or in the interior of the covering element, wherein a boom which is mounted movably at least in one spatial axis is included for guiding a transport pipe for the compressed air from the carrier element, wherein the transport pipe on the side opposite the compressed-air-generating element comprises a connecting element which can be brought into or is in operative connection with the valve of the expansion body in order by means of the compressed-air-generating element to charge and to expand the expansion body with compressed air.

Furthermore, it can be preferred that the connecting element is designed and configured to actuate the valve of the expansion body in order to contract the expansion body.

For expanding and contracting the expansion body, use is preferably made of a valve which is integrated in the expansion body. The valve itself can either be charged with pressure by means of the connecting element or positive pressure in the expansion body can be let out of the expansion body by bringing the connecting element into operative connection with the valve.

In order to expand the expansion body, use is preferably made according to the invention of compressed air. The compressed air is either generated here in situ or carried along in a compressed-air container. In order to connect the connecting element to the valve of the expansion body, it has moreover proven advantageous for use to be made of a boom which is movable in at least one spatial axis and at the loose end of which the connecting element is located. The connecting element is preferably connected here to the transport pipe for compressed air, said transport pipe being connected in turn to the compressed-air-generating element.

It can be advantageous here that the boom is movable in the at least one spatial axis, in particular in two, preferably in three spatial axes, by means of at least one actuator, in particular an electric motor.

Movement of the boom by means of an actuator, for example an electric motor or a hydraulic or pneumatic cylinder, is particularly advantageous since the boom is therefore provided in the form of a robot arm which can be remotely controlled by a user.

In this connection, it can be particularly preferred that a camera is included which is arranged on the carrier element, wherein the camera is arranged adjacent to the boom.

According to the prior art, cameras are arranged on a boom which extends outside the actual carrier element. It has been shown, however, that, because of the sight conditions, the distortion due to the external perspective and the light conditions, in particular the relatively small valve of the expansion body and a closure element for the second recess can be started up by a user only with a great deal of complexity with the boom. An arrangement of a camera, which is also intended, within the context of the present invention, to include a system of cameras or image capture devices, adjacent to the boom overcomes these disadvantages. Furthermore, a camera according to the invention can be brought into or can be in operative connection with a light source in order to permit an improved display of the objects to be manipulated by the user.

According to an embodiment of the present invention, the viscous, curable rehabilitation compound is an epoxy resin and/or the rehabilitation compound consists of a one- or two-component resin and/or a temperature of at least 100°, 90°, 80°, 70°, 60°, 50°, 40°, 30°, 20° or 10° C. is necessary for hardening the epoxy resin.

Two-component resins have proven particularly advantageous sealing compounds. The selection of a one- or two-component resin with curing at a high temperature can also be advantageous since curing then takes place only when the heating device according to the invention is in operation. Any desired pot life can therefore be permitted.

It can also be provided, according to an embodiment of the present invention, that the second recess is closed by means of a closure element, wherein in particular the closure element is openable and closeable by means of the carrier element and/or a further carrier element, wherein the further carrier element is mounted movably in at least one, in particular two, preferably three spatial axes.

Such a closure element is advantageous since the sealing compound which is not yet cured is therefore prevented from penetrating through the second recess which, although small, is present.

Finally, it can be provided that the transport means is connected to the carrier element or to the further carrier element such that the end of the transport means opposite the storage container can be arranged or is arranged on or at least partially in the second recess in order to introduce the rehabilitation compound into the space between the shuttering and the walls of the main and secondary pipes adjacent to the shuttering.

The invention also supplies a method for rehabilitating damaged pipe walls in the region of the connection of a secondary pipe to a main pipe, comprising the following steps, in particular in this sequence:

a) providing an apparatus according to the invention;
b) moving the carrier element to the region to be rehabilitated;
c) expanding the covering element until it lies against the inner wall of the main pipe;
d) positioning the expansion body by means of the first recess of the covering element;
e) expanding the expansion body;
f) positioning the transport means on the second recess of the covering element; and
g) heating the covering element and/or the transport means before, during and/or after transporting the rehabilitation compound into the space between the shuttering and the walls of the main and secondary pipes adjacent to the shuttering.

Finally, the invention provides use of an apparatus according to the invention for rehabilitating damaged pipe walls in the region of the connection of a secondary pipe to a main pipe.

Further features and advantages of the invention emerge from the description below in which exemplary embodiments of the invention will be explained by way of example with reference to schematic drawings without thereby restricting the invention.

Figure 1:
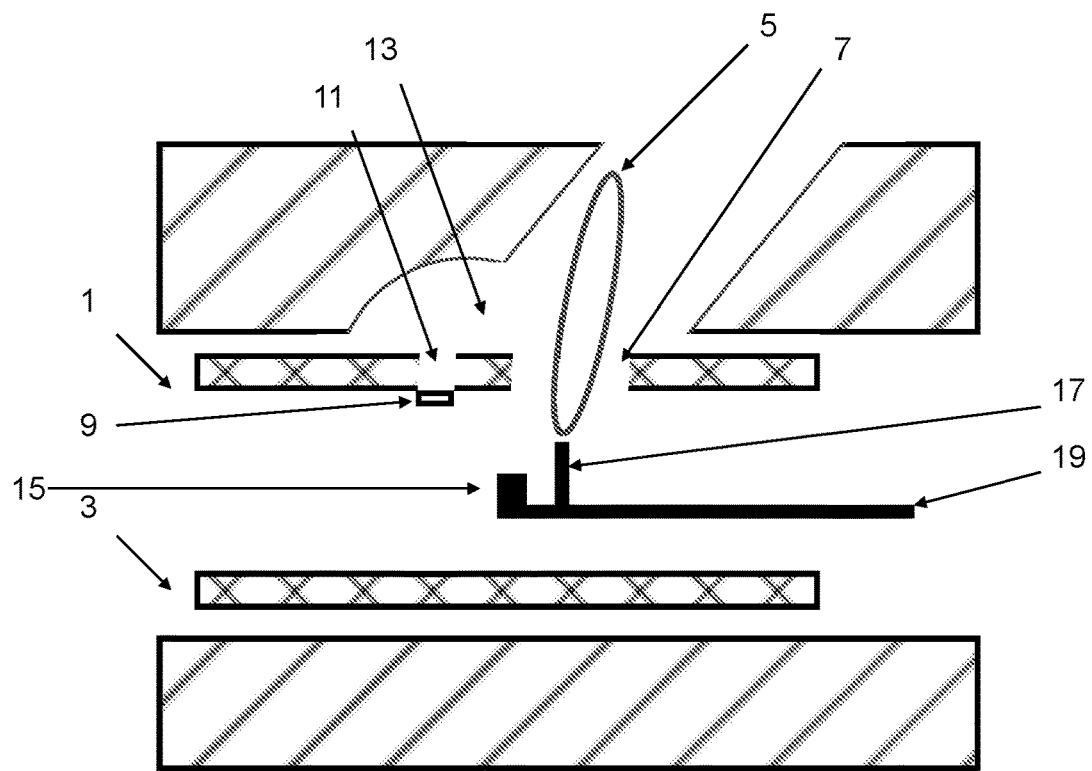
FIG. 1 shows a schematic view of a detail of an apparatus according to the invention and a shuttering system according to the invention in a pipe system in the transport state in section.

An apparatus 1 according to the invention is only partially illustrated in the figures. For example, a chassis and a storage container for the rehabilitation compound are not shown. FIG. 1 schematically illustrates a transport state of an apparatus according to the invention. The apparatus 1 comprises a covering element 3 and an expansion body 5. The covering element 3 here is in the form of a shuttering sleeve and the expansion body 5 is in the form of a balloon. The expansion body 5 is already partially arranged here in a first recess 7. A closure element 9 closes a second recess 11 through which the rehabilitation compound can be introduced into the cavity 13 closed by the expansion body 5 and the covering element 3, in order to rehabilitate the damaged area in the pipe system. A camera 15 and a boom 17 are arranged here on a carrying arm 19 of the first apparatus 1, which is only partially shown.

As apparent in FIG. 1, the covering element 3 is arranged at a distance from the inner wall of the main pipe and the expansion body 5 is already located in the first recess 7. Simple transport of the two shuttering elements to the portion of the pipe system to be rehabilitated is therefore made possible.

Figure 2:
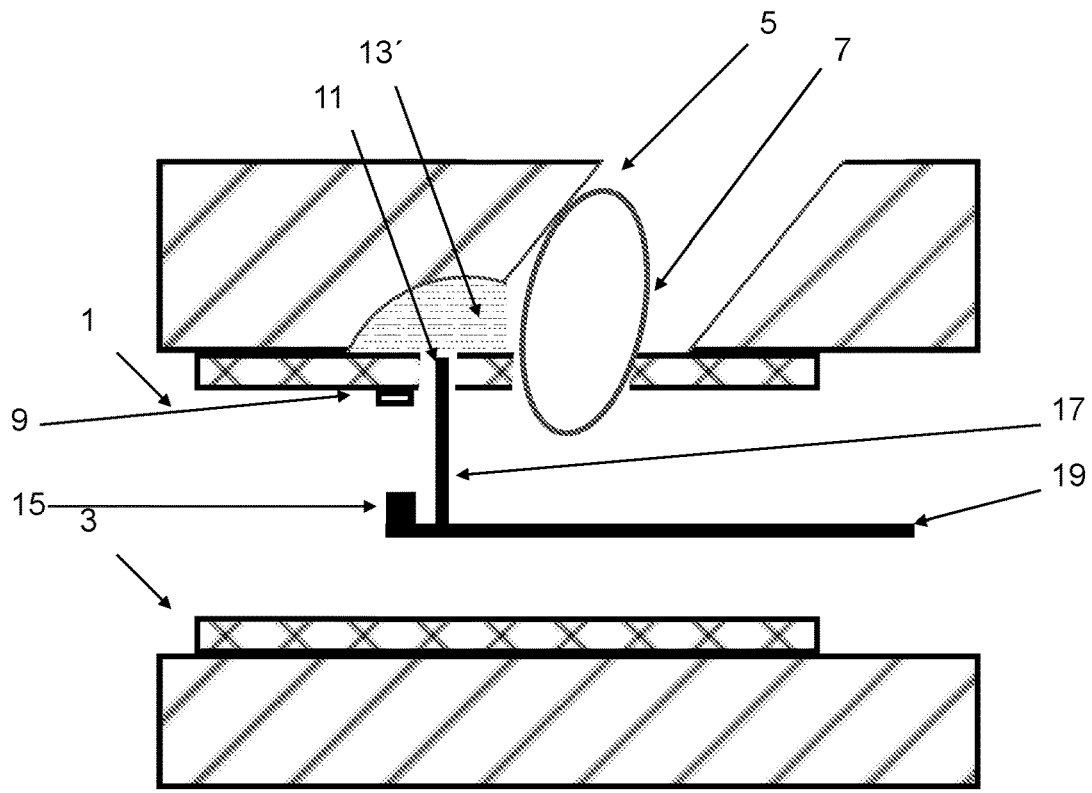
FIG. 2 shows a schematic view of a detail of an apparatus according to the invention and a shuttering system according to the invention in a pipe system in the operating state in section.
Figure 3:
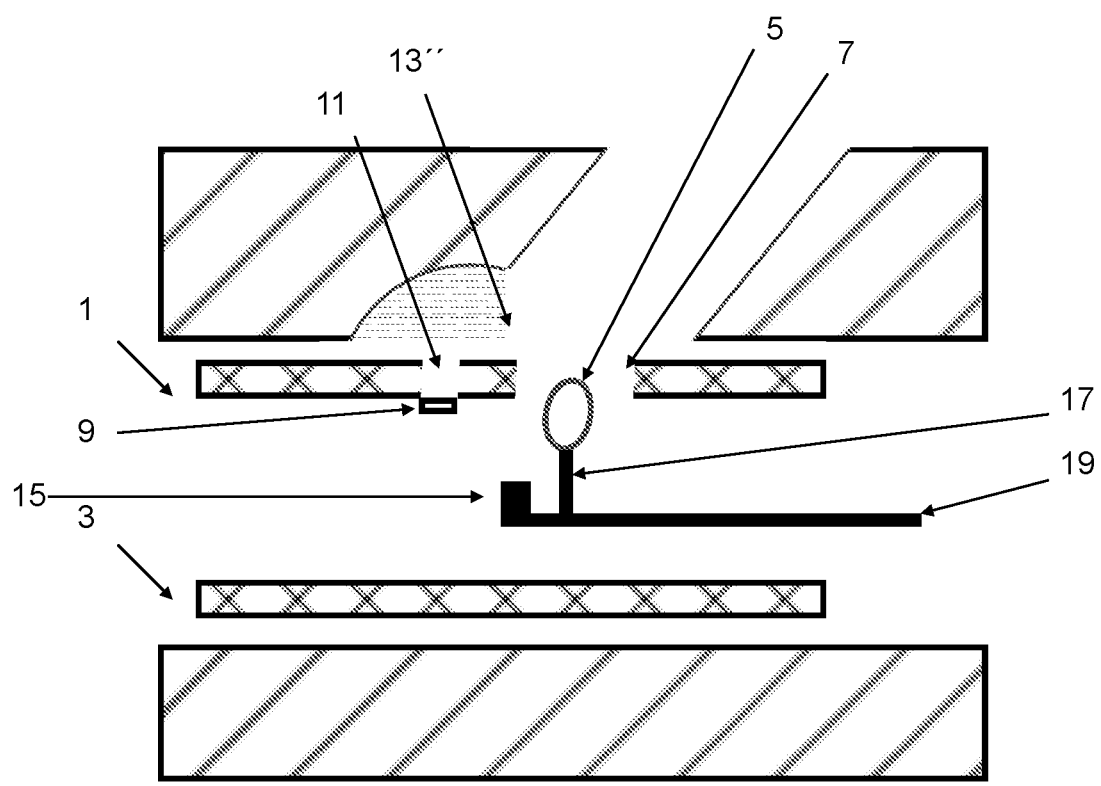
FIG. 3 shows a schematic view of a detail of an apparatus according to the invention and a shuttering system according to the invention in a pipe system after rehabilitation in section.

FIG. 2 illustrates the operating state of the apparatus according to the invention. The covering element 3 is expanded here such that it lies firmly against the inner wall of the main pipe. The expanded expansion body 5 equally lies tightly in the secondary pipe against the inner wall of the secondary pipe. The cavity 13' which is therefore closed is filled with the rehabilitation compound by means of the boom 17 through the second recess 11 which is exposed by opening of the closure element 9. Subsequently, the closure element 9 is closed and the rehabilitation compound can cure.

In order to accelerate the curing, a heating apparatus (not shown) is used according to the invention. This can be arranged, for example, directly in the covering element 3 in the region of the second recess 11, or can be integrated in the transport means for the rehabilitation compound. The heating device can also be operatively connected to the covering element or to the transport means and not integrated directly therein.

After curing has taken place, the expansion body 5 is contracted and the outside diameter of the covering element 3 is also reduced, and therefore the shuttering formed from said two elements can be removed. The rehabilitation compound 13" is cured at this point and the rehabilitation of the pipe has therefore been concluded successfully.

The features of the invention disclosed in the above description and the claims may be essential both individually and in any desired combination for implementing the invention in its various embodiments.

The invention claimed is:

1. An apparatus for rehabilitating damaged pipe walls in a region of a connection between a secondary pipe and a main pipe, comprising:
    a mobile carrier element including:
        a covering element and an expandable expansion body arranged on the carrier element,
        wherein the expandable expansion body, when not expanded, is positionable at least partially in a first recess of the covering element and at least partially in the secondary pipe,
        wherein the expandable expansion body when expanded, lies against the wall of the secondary pipe such that the covering element and the expansion body together form a shuttering, and
        wherein the covering element includes a second recess through which a viscous, curable rehabilitation compound can be introduced by a transport means from a storage device into a space defined between the shuttering and walls of the main and secondary pipe adjacent to the shuttering; and
    a heating device which is at least one of integrated in the storage device or operatively connected to the storage device.

2. The apparatus according to claim 1, wherein the heating device is integrated in the covering element and/or is operatively connected to the covering element.

3. The apparatus according to claim 1, wherein the heating device is in the form of at least one of a heating tube, a radiation source, an infrared heating apparatus, a microwave-generating device, or an electric heater.

4. The apparatus according to claim 3, wherein the heating device is a microwave-generating device comprising:
    a magnetron configured to generate microwaves; and
    a radiation antenna, for radiating the microwaves generated by the magnetron into the space between the shuttering and the walls of the main and secondary pipes adjacent to the shuttering and/or into the storage device,
    wherein the radiation antenna is at least one of formed by, surrounded by, or operatively connected to the covering element.

5. The apparatus according to claim 1 wherein the storage device is arranged on the carrier element.

6. The apparatus according to claim 1, wherein the rehabilitation compound can be introduced from the storage device by pressurization into the interior of the storage device and/or by a pumping device via the transport means into the space behind the shuttering.

7. The apparatus according to claim 1, wherein the covering element is a shuttering sleeve having a smaller inside diameter in a transport state than in an operating state.

8. The apparatus according to claim 1, further comprising a compressed-air-generating element including at least one of a compressor or a compressed-air container, the expansion body is expandable by compressed air generated by the compressed-air-generating-element.

9. The apparatus according to claim 8, wherein the expansion body further comprises a valve positioned proximate the first recess and/or in the interior of the covering element, the apparatus further comprising:

a boom mounted to the apparatus and movable along at least one spatial axis of the apparatus for guiding a transport pipe from the carrier element, the transport pipe including a connecting element positioned at an end of the transport pipe opposite the compressed-air-generating-element, wherein the connecting element is configured to be brought into operative connection with the valve of the expansion body in order to expand the expansion body with compressed air from the compressed-air-generating-element.

10. The apparatus according to claim 9, wherein the connecting element is configured to actuate the valve of the expansion body in order to contract the expansion body.

11. The apparatus according to claim 9, wherein the boom is movable in one to three spatial axes, by means of an actuator.

12. The apparatus according to claim 9, further comprising a camera arranged on the carrier element adjacent to the boom.

13. The apparatus according to claim 1, wherein the viscous, curable rehabilitation compound is an epoxy resin and/or the rehabilitation compound consists of a one- or two-component resin and/or a temperature of at least 100°, 90°, 80°, 70°, 60°, 50°, 40°, 30°, 20° or 10° C. is necessary for hardening the epoxy resin.

14. The apparatus according to claim 1, wherein the second recess is closed by means of a closure element, wherein in particular the closure element is openable and closeable by means of the carrier element and/or a further carrier element, wherein the further carrier element is mounted movably in one to three spatial axes.

15. The apparatus according to claim 14, wherein the transport means is connected to the carrier element or to the further carrier element such that the end of the transport means opposite the storage container can be arranged or is arranged on or at least partially in the second recess in order to introduce the rehabilitation compound into the space between the shuttering and the walls of the main and secondary pipe adjacent to the shuttering.

16. A method for rehabilitating damaged pipe walls in the region of the connection of a secondary pipe to a main pipe, comprising the following steps, in the following sequence:

a) providing an apparatus for rehabilitating damaged pipe walls in a region of a connection between a secondary pipe and a main pipe, the apparatus comprising a mobile carrier element including a covering element and an expandable expansion body arranged on the carrier element, wherein the expandable expansion body, when not expanded, is positionable at least partially in a first recess of the covering element and at least partially in the secondary pipe, wherein the expandable expansion body when expanded, lies against the wall of the secondary pipe such that the covering element and the expansion body together form a shuttering, and wherein the covering element includes a second recess through which a viscous, curable rehabilitation compound can be introduced by a transport means from a storage device into a space defined between the shuttering and walls of the main and secondary pipe adjacent to the shuttering; and a heating device which is at least one of integrated in the storage device or operatively connected to the storage device;

b) moving the carrier element to the region to be rehabilitated;

c) expanding the covering element until it lies against the inner wall of the main pipe;

d) positioning the expansion body by means of the first recess of the covering element;

e) expanding the expansion body;

f) positioning the transport means on the second recess of the covering element;

g) heating the covering element and/or the transport means before, during and/or after transporting the rehabilitation compound into the space between the shuttering and the walls of the main and secondary pipe adjacent to the shuttering.

17. A method comprising:

a) providing an apparatus for rehabilitating damaged pipe walls in a region of a connection between a secondary pipe and a main pipe, the apparatus comprising a mobile carrier element including a covering element and an expandable expansion body arranged on the carrier element, wherein the expandable expansion body, when not expanded, is positionable at least partially in a first recess of the covering element and at least partially in the secondary pipe, wherein the expandable expansion body when expanded, lies against the wall of the secondary pipe such that the covering element and the expansion body together form a shuttering, and wherein the covering element includes a second recess through which a viscous, curable rehabilitation compound can be introduced by a transport means from a storage device into a space defined between the shuttering and walls of the main and secondary pipe adjacent to the shuttering; and a heating device which is at least one of integrated in the storage device or operatively connected to the storage device;

b) using the apparatus to rehabilitate damaged pipe walls proximate to a connection between a secondary pipe and a main pipe.

\* \* \* \* \*